June 15, 1937.　　　　　G. T. BALFE　　　　　2,084,054

GASKET

Original Filed Jan. 3, 1931

Inventor

George T. Balfe

By Cushman Darby & Cushman
　　　　　　　　Attorneys

Patented June 15, 1937

2,084,054

UNITED STATES PATENT OFFICE 2,084,054

GASKET

George T. Balfe, Detroit, Mich., assignor to Detroit Gasket & Mfg. Co., Detroit, Mich., a corporation of Michigan Original application January 3, 1931, Serial No. 506,441, now Patent No. 1,928,585, dated September 26, 1933. Divided and this application September 23, 1933, Serial No. 690,739

1 Claim. (Cl. 288—1)

This invention relates to gaskets, particularly for automotive use.

The object of the invention is to provide a unitary gasket of built-up structure affording a very adequate seal in the case of complicated joints as well as joints, the surfaces of which, are possessed of irregularities frequently difficult to compensate for.

I have used with success, gaskets built-up from a plurality of separate gasket layers made in accordance with my United States Patents Nos. 1,927,450 and 1,776,140, and connected together by stitching, grommets and similar independent fastening means.

In the present invention, the metal and asbestos and other cushioning layers are built up into an integral structure, thereby (1) eliminating the necessity for separable fastening means and (2) providing a gasket in which any number of layers may be used without requiring that they be formed from independent gasket structures. In some cases, such an integral built-up gasket is highly advantageous.

While in the accompanying drawing I have illustrated a representative gasket embodying the invention, it is to be understood that the invention may take other forms and shapes in accordance with the joint to be sealed.

Referring to the drawing.

Figure 1:
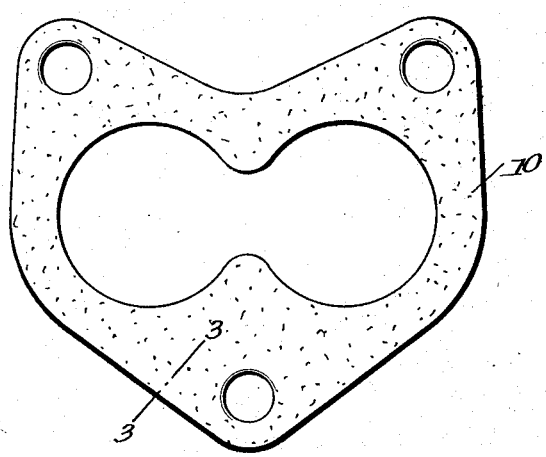
Figure 1 is a top plan view.
Figure 2:
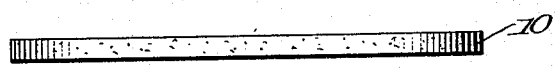
Figure 2 is a side elevation.
Figure 3:
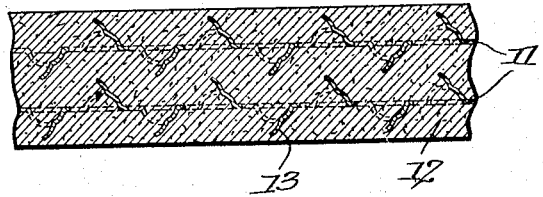
Figure 3 is a section on the line 3—3 of Figure 1.

The gasket 10 is formed of alternate layers of metal 11, preferably of steel, and cushion material 12, such as asbestos. The metal layers are formed with struck-up projections 13 as in my aforesaid patents. In forming the gasket, in accordance with the example illustrated in the drawing, two metal layers having tangs or projections 13 struck out from opposite sides are disposed between three cushion layers in alternate relation. The assembly is then compressed as a whole so as to embed the tangs 13 in the cushion layers. In this manner, the layers are united into a built-up integral structure. The intermediate unitary layer 12 in this construction has the projections 13 embedded therein from opposite sides.

It will be appreciated that the surfaces of the gasket may consist of metal or cushion layers or one of each.

The gasket has been found very advantageous in the sealing of difficult types of joints and is particularly useful where irregularities in the joint surfaces have constituted a major problem.

While in the drawing, the projections are shown as not coming to the surface, it is to be understood of course, that in accordance with my aforesaid patents, wherever it is desired to dissipate heat using the projections as conduits, that the tangs are brought to the surface.

It is to be understood that the forms of the invention shown and described are merely illustrative of preferred embodiments and that such changes may be made as fall within the scope of one skilled in the art without departing from the spirit of the invention and the scope of the appended claim.

This application is a division of my application Serial No. 506,441, filed January 3, 1931, now Patent No. 1,928,585, issued September 26, 1933.

I claim:—

A gasket comprising a plurality of alternate layers of cushion material and metal, a unitary, intermediate layer of cushion material disposed between adjacent metal layers, the metal layers having struck-up projections extending outwardly from their faces for holding the layers together, said intermediate layer of cushion material having the holding projections extending thereinto from opposite sides of the cushion layer, at least one of said metal layers having a layer of cushion material on the side thereof opposite said intermediate layer, and projections formed on the metal layer and extending into the last mentioned cushion layer.

GEORGE T. BALFE.